United States Patent [19]
McMillian et al.

[11] 3,767,850
[45] Oct. 23, 1973

[54] GRAPHIC RECORDING APPARATUS AND METHOD

[75] Inventors: Lonnie S. McMillian; Arthur H. Hutchison; Leslie H. Gard, all of Huntsville, Ala.

[73] Assignee: Abbott Laboratories, North Chicago, Ill.

[22] Filed: Feb. 22, 1972

[21] Appl. No.: 228,173

[52] U.S. Cl. .......................... 178/6.7 R, 250/71.5 S
[51] Int. Cl. .......................... G01t 1/20, H04n 5/84
[58] Field of Search .................. 178/6.6 R, 6.7 R; 250/52, 71.5 S, 83 R, 234

[56] References Cited
UNITED STATES PATENTS
3,428,805  2/1969  Donato et al. ................... 250/71.5 S
3,549,887  12/1970  Hansen ............................ 178/6.7 R Primary Examiner—James W. Moffit
Attorney—Molinare, Allegretti, Newitt & Witcoff

[57] ABSTRACT

The disclosure describes apparatus for preventing scalloping the photographic film image produced by a scintillation scanner. The described scanner comprises a detector which can be scanned along parallel paths over an area of interest in a patient. The detector is directly coupled to a light-emitting tube that simultaneously is scanned in a similar manner over a photographic film. Gamma rays emitted by the patient are received by the detector and are converted into corresponding electrical event pulses and bits of event information which are sequentially shifted through shift registers in response to periodic clock pulses. A stepping motor moves the detector and light-producing tube a predetermined distance in response to the receipt of each clock pulse so that the concentration of gamma ray events occuring along any particular segment of the detector scan path can be precisely determined. An individual event pulse is transmitted to the light-producing tube after is has been shifted halfway through the shift register, so that the information stored in the shift register represents gamma ray events occurring before and after the gamma ray event resulting in the event pulse.

21 Claims, 14 Drawing Figures

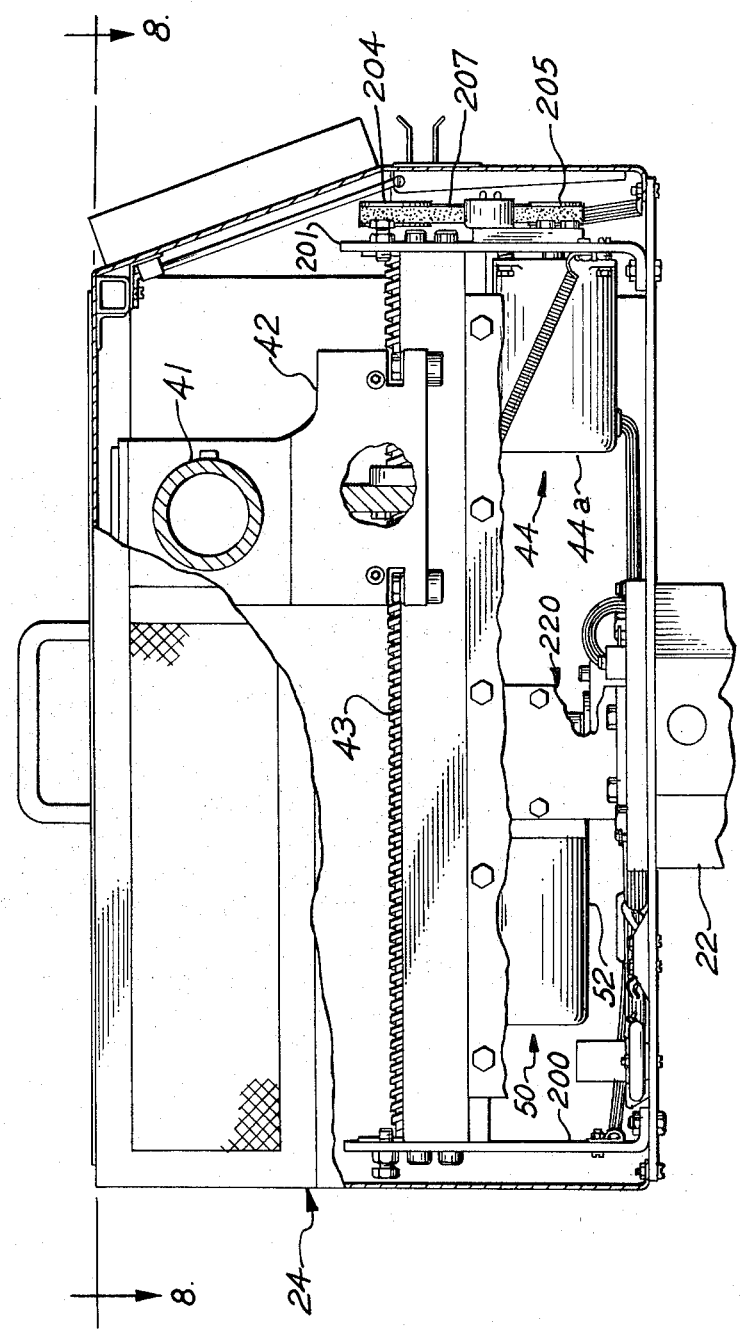

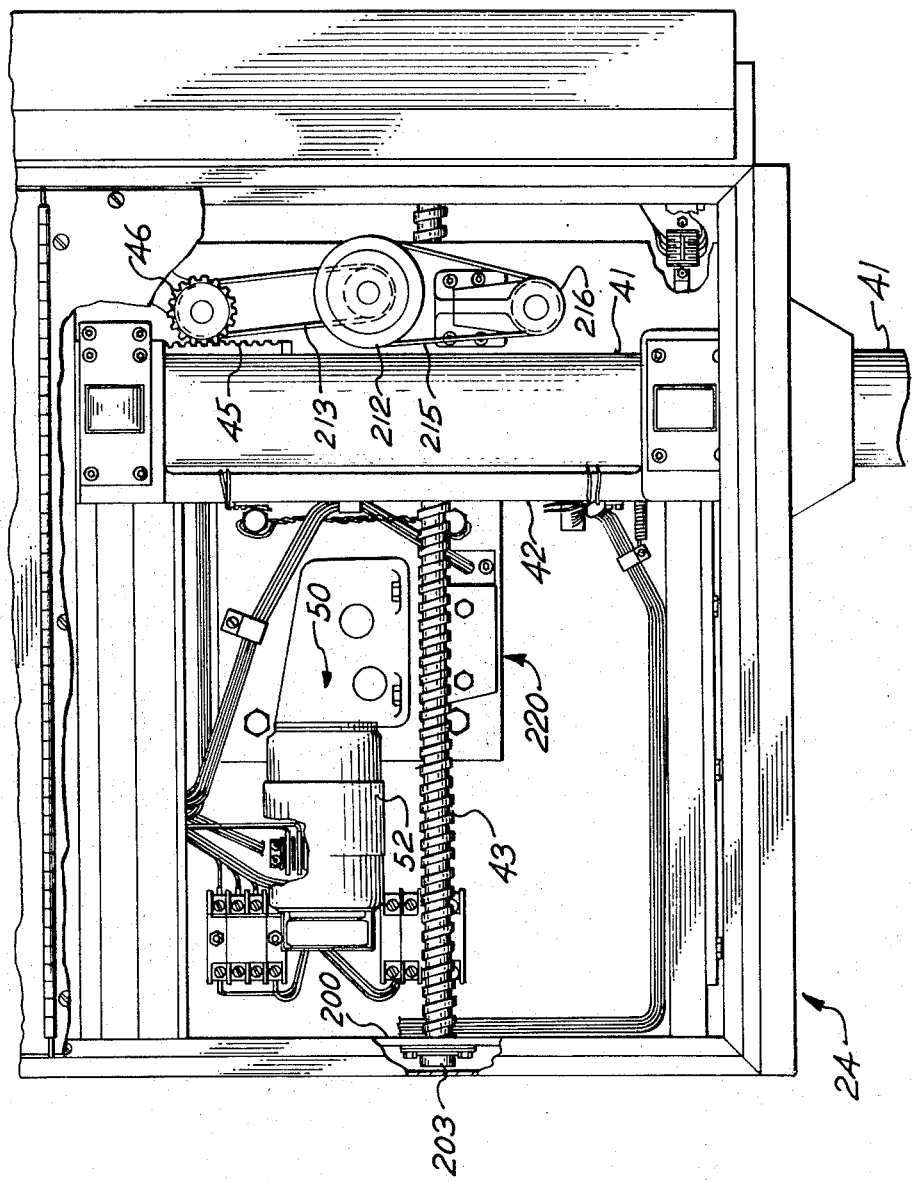

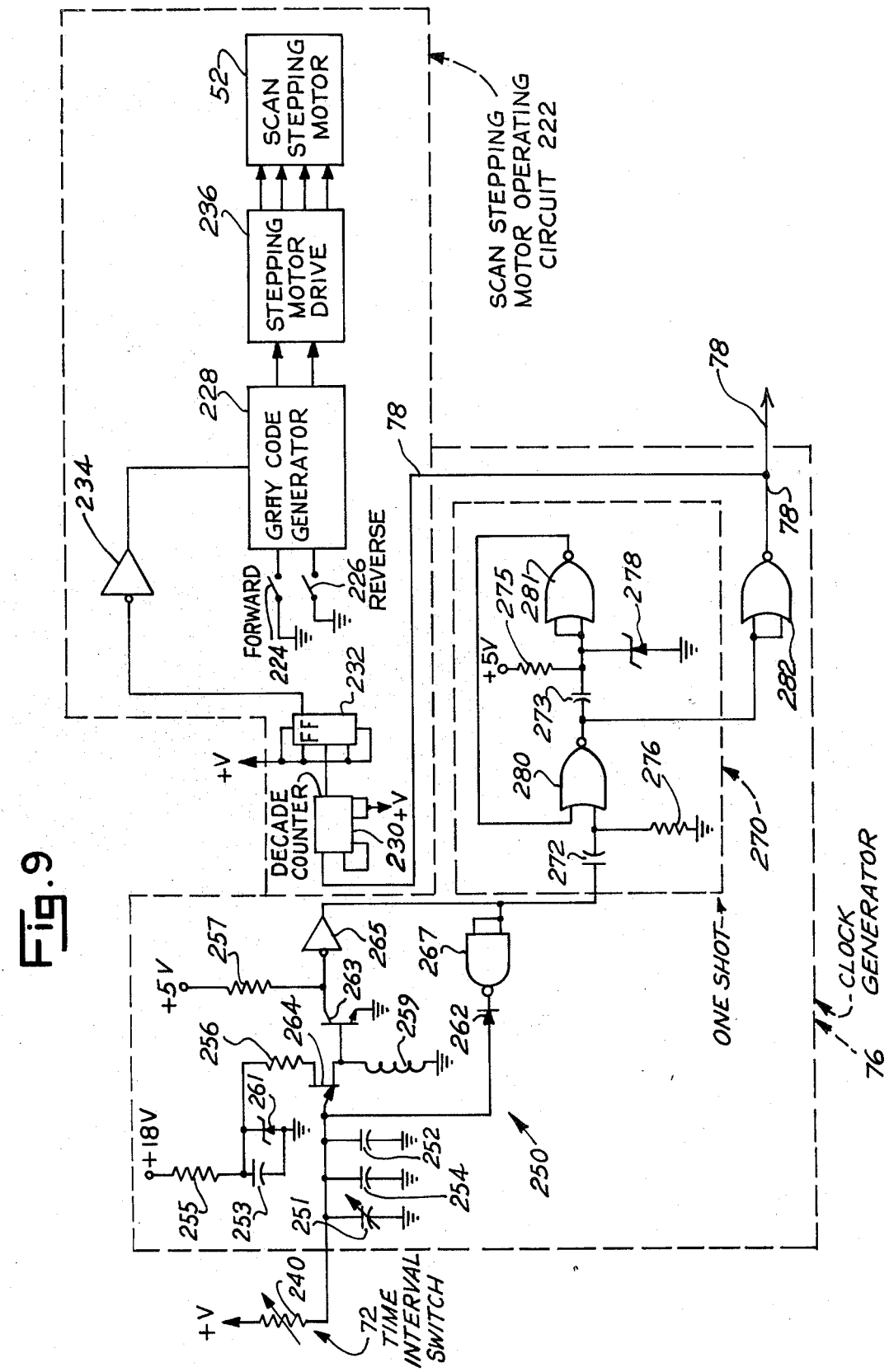

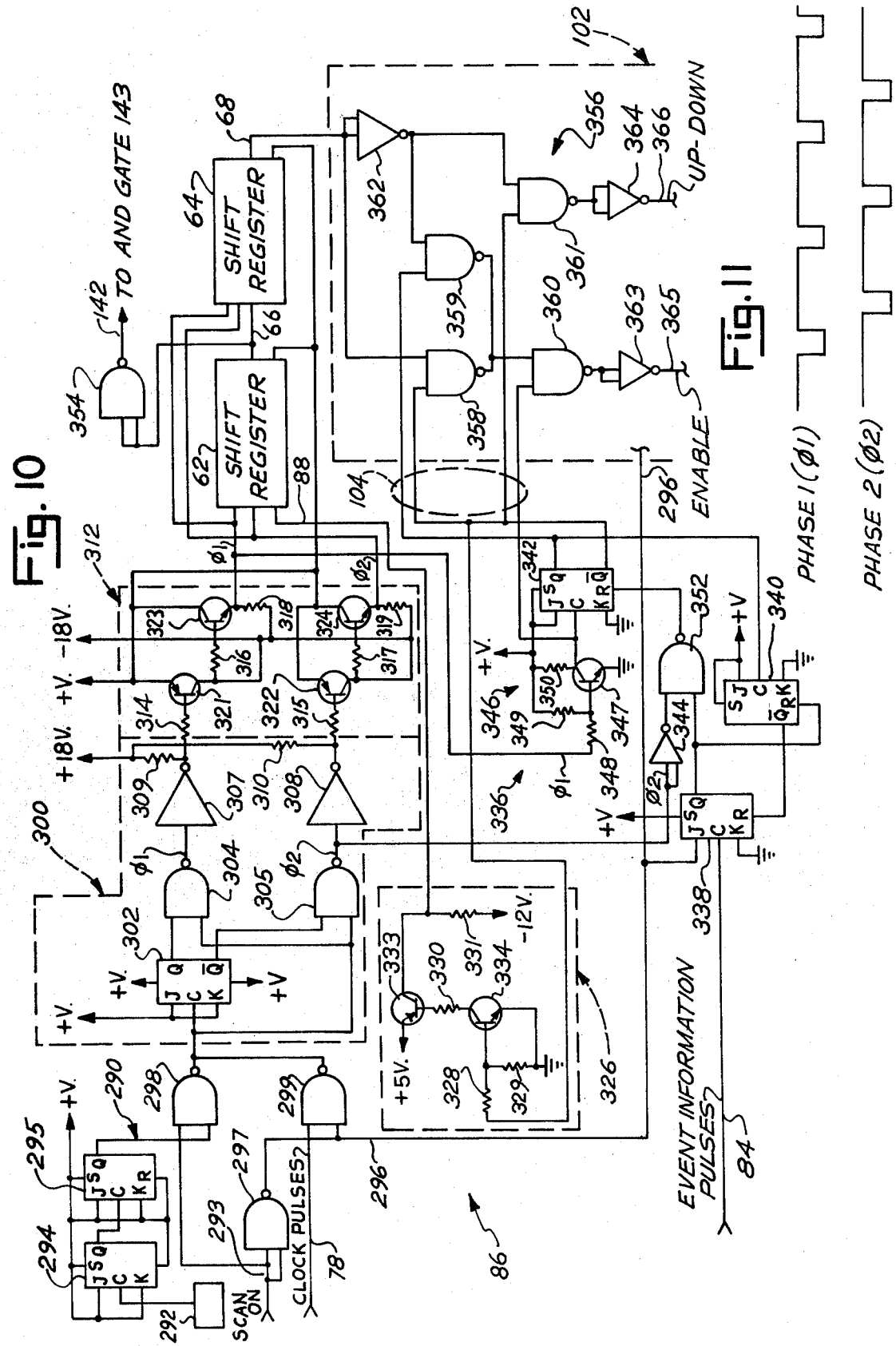

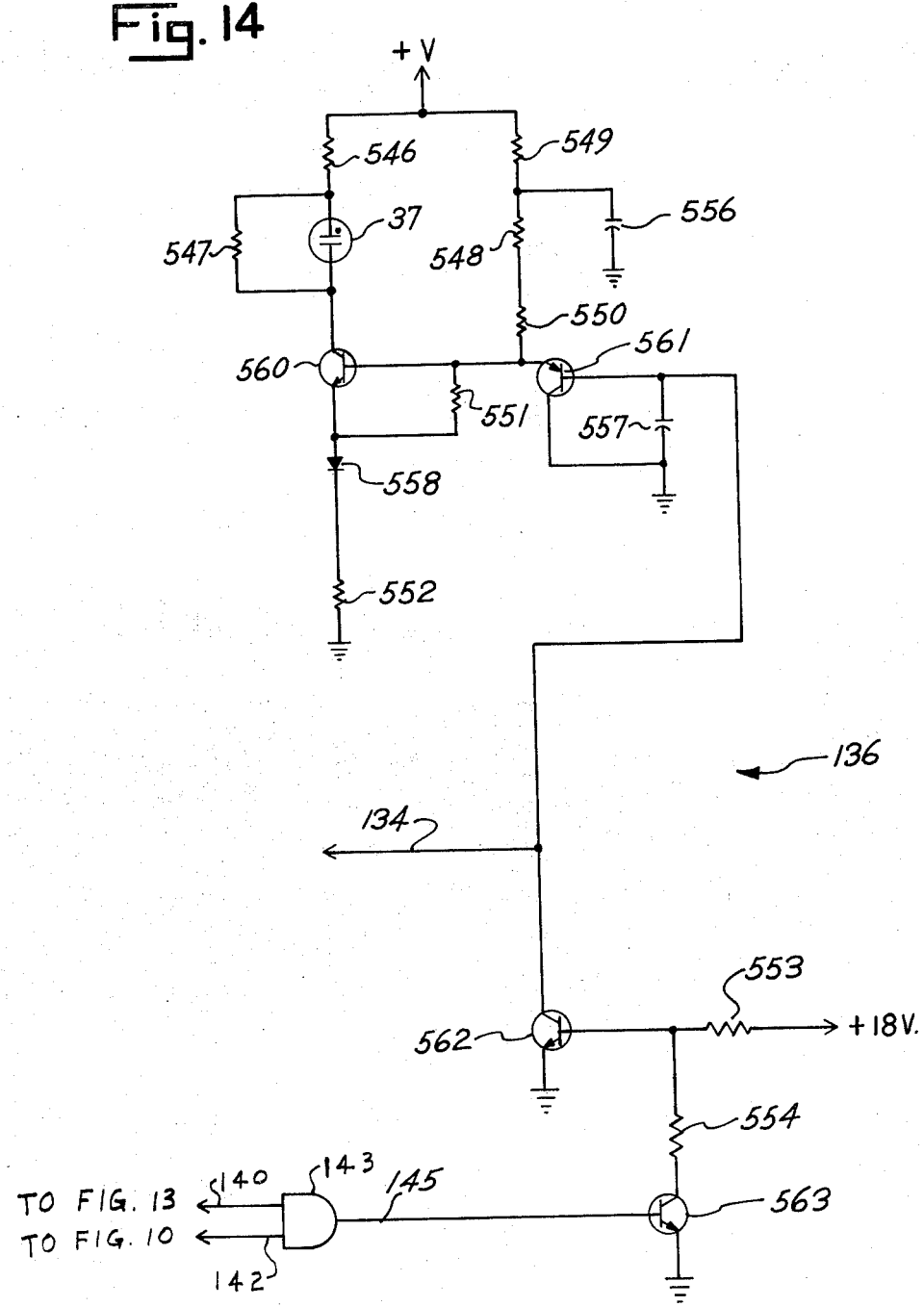

GRAPHIC RECORDING APPARATUS AND METHOD

BACKGROUND OF THE INVENTION

This invention relates to scintillation scanners, and more particularly relates to apparatus for controlling the radiographic image produced by a scintillation scanner.

Scintillation scanners are well known to the medical profession and are useful for diagnosing and detecting the location of diseased tissue, such as tumors. In order to use a scintillation scanner for this purpose, a patient is given a special substance that is selectively absorbed by a particular tissue of the body, such as the thyroid, lungs, brain, or liver. When the substance is manufactured, it is doped with a radioisotope which radiates gamma rays. By measuring the concentration of gamma rays emitted from a patient, the extent to which the substance has been absorbed by the tissue can be determined by means of a scintillation scanner.

A scintillation scanner for detecting gamma rays emitted from a patient generally consists of a lead collimator which passes only gamma rays that are emitted from a very small volume within the tissue. A special gamma-sensitive crystal is used to convert these gamma rays passed by the collimator into small light flashes which are amplified and converted into electrical pulses by a photomultiplier tube. The electrical pulses are generally passed through a pulse height analyzer which eliminates the effect of gamma rays that are outside the known energy spectrum of the gamma rays emitted by the radioisotope in the substance.

The crystal and associated collimator are moved across the patient by means of a mechanical scanning arrangement so that the tissue of interest in the patient is covered by a rectilinear scanning pattern carefully controlled as to speed and location. The mechanical scanning arrangement simultaneously moves a light source over a photographic film with the same scanning motion. For every gamma ray of the proper energy spectrum received by the collimator, a pulse of light is generated by the light source and is used to expose the film. The film is later developed so that a synthesized image of the tissue can be observed and used for diagnostic purposes.

A variety of control devices have been used in the past in order to control the manner in which light is generated by the light source. For example, it has been found that the image on the film resulting from a scintillation scanner can be improved for diagnostic purposes by a technique known as background erase. According to this technique, gamma rays originating from an area of relatively high gamma ray concentration produce an image on the film, whereas gamma rays originating from an area of relatively low gamma ray concentration produce no image on the film. This technique is particularly useful when the radioisotope-doped substance is trapped in the tissue of interest in high concentration, and is trapped in surrounding tissue in relatively low concentration. In this situation, the tissue of interest produces an easily-visible image on the film, whereas the surrounding tissue produces no image at all.

One method of implementing a background erase mode of operation is to determine an average activity level, or gamma ray count rate per square centimeter, and to use some percentage of the average as a threshold level below which pulses are rejected, and above which pulses are passed to expose the film. This method of implementation generally has the effect of passing all pulses when the average gamma ray activity rate is high (such as in a tissue of interest) and in rejecting all pulses when the average gamma ray activity rate is low (such as in areas surrounding the tissue of interest). Normally, the average activity level is determined by counting pulses per unit time with an electronic counter which is periodically reset by an arbitrary clock source that is related to real time. Since the clock source is not synchronized with the motion of the gamma ray detector, the averaging of pulses per unit time generally does not occur over the same relative scan area of adjoining scan paths. For example, if the scintillation scanner is in motion at the border line of an area of low activity and an area of high activity, the activity level might be averaged primarily in the area of high activity during one scan and might be averaged primarily in the area of low activity on the next scan. This mode of operation results in an asymmetrical appearance of the resulting photographic image which complicates diagnosis.

Accordingly, one object of the present invention is to relate the averaging of gamma ray activity to an actual segment of a detector scan path so as to produce a consistent image from one scan path to the next.

Previous methods of implementing a background erase mode of operation are also deficient in that they create so-called "scalloping" of the resulting photographic image. "Scalloping" occurs primarily because the decision whether to record a particular gamma ray event is based on the average activity level of events occurring in the past. For example, if the gamma ray detector is in an area of low activity moving toward an area of high activity, no light exposes the film since the average activity level is below the selected threshold level. As soon as the boundary of the high activity area is reached, the average activity level begins to increase. However, the high activity area must be penetrated for some time before the average activity level rises sufficiently to exceed the selected threshold level. As a result, light pulses appear on the film past the boundary of the high activity area, rather than at the boundary.

The foregoing mode of operation is reversed when the scanner is traveling from an area of high activity to an area of low activity. In this case, the average activity level remains high for some time after the boundary is passed, so that light pulses appear on the film beyond the boundary line into the area of low activity. As a result, light pulses are indented in one direction along one scan path and are indented in the opposite direction along an adjoining scan path, so that a "scalloping" effect is visible on the film.

Accordingly, it is another object of the present invention to provide improved techniques to eliminate "scalloping" and to produce a photographic image which accurately records the gamma ray activity of the area scanned.

Experience has also shown that a photographic image resulting from a scintillation scanner can be more easily interpreted if a mode of operation known as contrast enhancement is employed. One method of implementing contrast enhancement is to control the intensity of light with which a particular gamma ray event is recorded in proportion to the average activity level which has occurred in the recent past. For example, apparatus is typically employed which determines the average level of gamma ray activity during a time unit immediately preceding the production of each event pulse to be recorded. The intensity with which the event pulse is recorded is determined by looking at this "past history" of activity. For example, if the pulse occurred in an area of high activity, the light intensity is increased in a nonlinear fashion, and conversely, if the pulse occurred in an area of low activity, the light intensity is decreased in a nonlinear fashion. This mode of operation results in a photograph in which pulses occurring in areas of high activity are blacker than normal, and in which pulses occurring in areas of low activity are whiter than normal. However, in prior art devices, contrast enhancement has resulted in the production of an asymmetrical image and in "scalloping" of the type described above.

Accordingly, it is another object of the present invention to provide improved techniques whereby contrast enhancement can be implemented without producing an asymmetrical image or "scalloping."

SUMMARY OF THE INVENTION

Applicants have been able to achieve the foregoing objects and advantages by producing an improved scintillation scanner comprising detection means for detecting a predetermined class of events for controlling the recording of individual events on a recording medium in response to the concentration of other such events in the class occurring in areas adjacent the individual events.

According to a principal feature of the invention, applicants provide recording means for recording the occurrence of an individual event on the recording medium. They also provide scanning means for moving the detection means in a first direction along a first scan path and for moving the detection means along a second scan path parallel to the first scan path. Means are also provided for coupling the recording means and scanning means so that they are moved simultaneously. Individual event information representing an individual event in the class occurring at an arbitrary first location along the first scan path is stored in a storage means. Additional information is stored representing other events in the class occurring before and after the individual event in segments of the first scan path lying on both sides of the first location at which the individual event occurred. Means are also provided for transmitting information from the detection means to the storage means and for also transmitting information from the storage means to the recording means. Control means analyze the information stored in the storage means in order to control the recording means so that the individual event information is recorded in response to the value of the stored information. In addition, means are provided for maintaining the recording means and the recording medium in a first relative position while the detection means is moving along the first scan path and for maintaining the recording means and the recording medium in a second relative position while the detection means is moving along the second scan path. As a result, events occurring in adjacent locations of the first and second scan paths are recorded in adjacent locations on the recording medium.

According to a principal feature of the method aspect of the invention, events in the class are detected along a first path segment and along a second path segment parallel to the first path segment. Information representing the events occurring along the first path segment is stored and its value is determined. The occurrence of an event located somewhere in the midsection of the first path segment is then recorded by varying a predetermined characteristic of the recording medium in proportion to the value of the stored information. Lastly, the relative positions at which events are recorded on the recording medium in the first and second scan paths is altered so that the events occurring in adjacent locations of the first and second scan paths are recorded in adjacent locations of the recording medium.

By using the foregoing apparatus or method, asymmetrical variations in the recorded image are avoided, and the "scalloping" effect which has plagued prior art techniques is completely eliminated. As a result, the exact configuration of tissue in the human body may be graphically represented with a degree of accuracy and clarity heretofore unattainable.

DESCRIPTION OF THE DRAWINGS

These and other objects, advantages and features of the present invention will become apparent in connection with the drawings, wherein like numbers refer to like elements throughout, and wherein:

FIG. 7 is a fragmentary view of a portion of the apparatus shown in FIG. 4 taken along line 7—7 of FIG. 4;

FIG. 8 is a view taken along line 8—8 of FIG. 7;

FIG. 9 is a schematic diagram of a preferred form of a clock generator and a scan stepping motor operating circuit made in accordance with the present invention;

FIG. 10 is a schematic diagram showing a preferred form of a storage circuit and a gating circuit;

FIG. 11 is a schematic drawing of certain idealized voltages produced by the gating circuit;

FIG. 14 is a schematic diagram of a preferred form of a light control circuit made in accordance with the present invention.

DESCRIPTION OF THE PREFERRED EMBODIMENT

Figure 1:
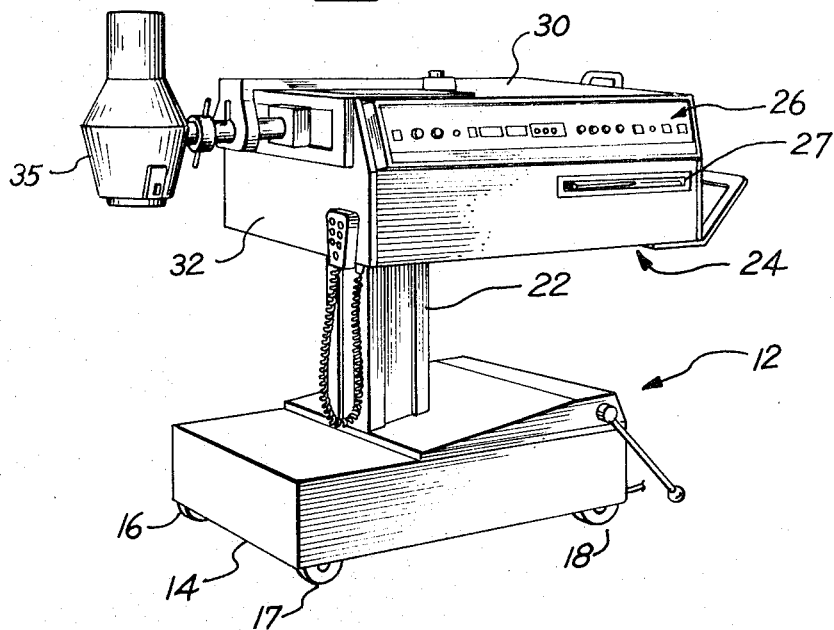
FIG. 1 is a perspective view of an exemplary scintillation scanner embodying a preferred form of the present invention.
Figure 2:
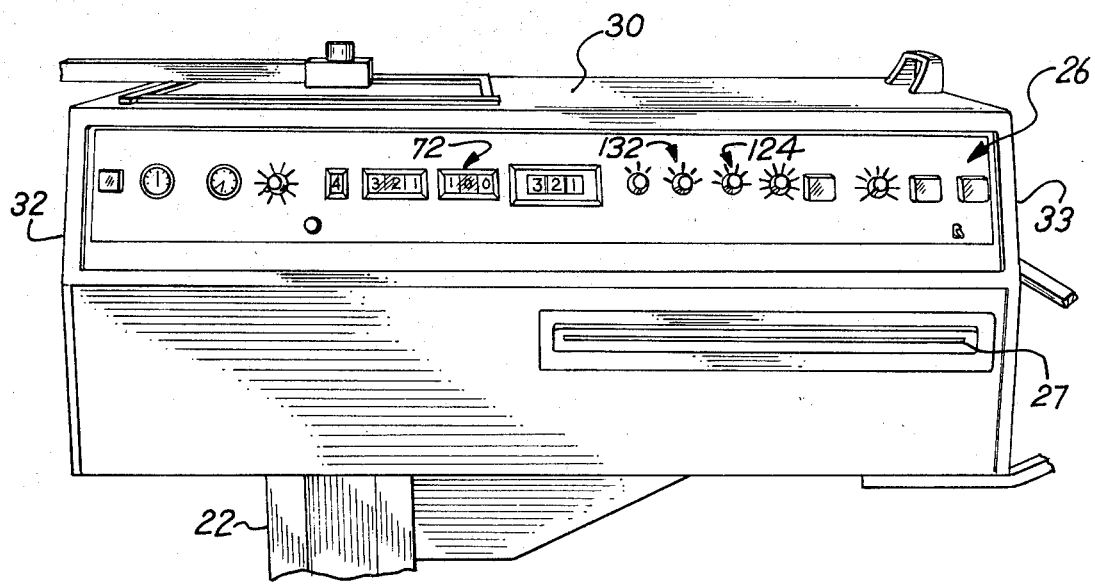
FIG. 2 is a front perspective view of the control panel and cabinet of the scanner shown in FIG. 1.
Figure 3:
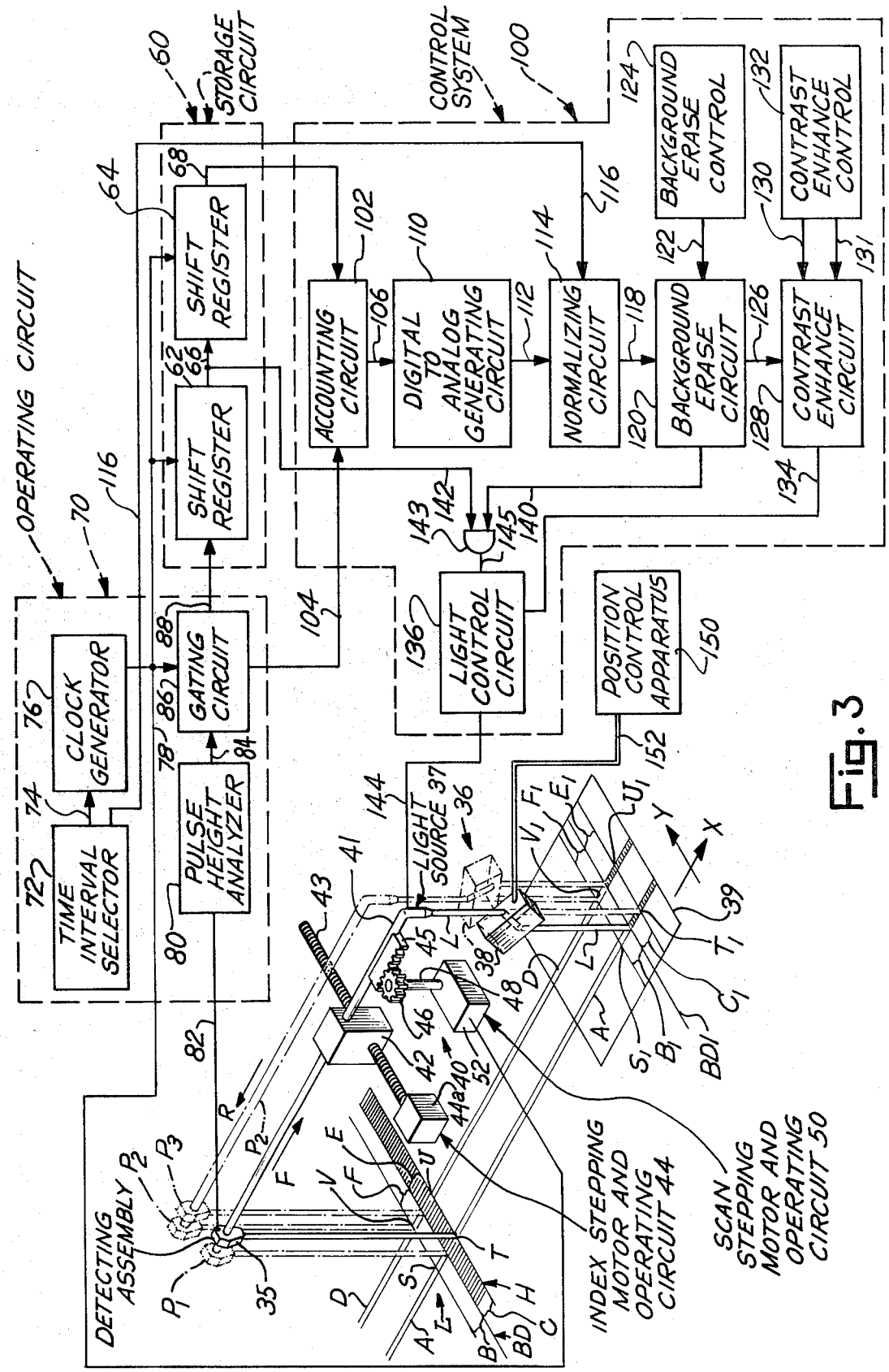
FIG. 3 is a schematic, fragmentary, block diagram drawing of a preferred form of the present invention.

General Description:

Referring to FIGS. 1 – 3, a preferred form of the present invention would basically comprise a frame assembly 12, a detecting assembly 35, a recording assembly 36, a scanning assembly 40, a storage circuit 60, an operating circuit 70, a control system 100, and a position control apparatus 150.

More specifically, referring to FIGS. 1 and 2, frame assembly 12 comprises a base 14 which is mounted on wheels 16, 17 and 18, together with another wheel mounted on the same axle as wheel 18 (not shown). Base 14 bears a pedestal 22 which supports a cabinet 24. The cabinet has a front panel including a film cassette slot 27 and various controls and readout devices to be described in more detail later. The cabinet also comprises a top panel 30 and side panels 32, 33 together with bottom and rear panels not shown so that the interior of the cabinet is completely enclosed.

Detecting assembly 35 comprises a lead collimator (not shown) which can focus on a small volume of gamma ray emission, and a conventional gamma ray-sensitive crystal (not shown) which converts gamma rays passed by the collimator into light flashes. The light flashes are amplified and converted into electrical pulses by a photomultiplier tube (not shown).

Referring to FIG. 3, recording assembly 36 comprises a light source 37, such as a glow modulator tube, that produces a controlled beam of light L which is passed through a variable-position planar prism 38 onto a sheet of photographic film 39.

Scanning assembly 40 basically comprises a coupling boom 41 which mechanically connects detecting assembly 35 to light source 37. Boom 41 is movably supported by a carriage 42 that may be moved in paths parallel to the Y axis by a ball screw 43 that is rotated by an index stepping motor and operating assembly 44 and an index stepping motor 44a. Movement of boom 41 in paths parallel to the X axis is achieved by a rack 45 that engages a pinion gear 46 which is mounted on a central shaft 48. Shaft 48 is rotated in either direction by a scan stepping motor and operating circuit 50 and a scan stepping motor 52. Stepping motor 52 moves boom 41 a predetermined distance in response to the receipt of a clock pulse in a well known manner.

Scanning assembly 40 is controlled by well known switching and control components in order to move detecting assembly 35 in a rectilinear scanning motion over an area of low gamma ray activity L and an area of high gamma ray activity H divided by a boundary line BD. In order to achieve the rectilinear scanning motion, the scan stepping motor and operating circuit 50 is energized so that boom 41 is moved along a scan path parallel to the X axis, such as scan path A or D. When the boom reaches the end of a scan path, the scan stepping motor is de-energized so that scanning motion temporarily stops. At the same time, the index stepping motor and operating circuit is energized so that boom 41 is moved along a path parallel to the Y axis until the next scan path is reached. For example, as the boom reaches the end of scan path A, the index stepping motor is energized so that ball screw 43 is rotated and carriage 42 moves the boom along the Y axis direction until detecting assembly 35 is located over scan path D. At this time, the index stepping motor and operating circuit is disabled, and the scan stepping motor and operating circuit is again enabled so that the detecting assembly moves along scan path D in a direction opposite the direction it moved along scan path A. For example, if boom 41 moves in direction F along scan path A, it is returned along scan path D in the reverse direction R. The foregoing pattern is followed until the entire area of interest has been scanned.

Although scan paths A and D have been shown in FIG. 3 as being separated by a relatively wide space, it should be understood that in practice the apparatus may be arranged so that scan paths A and D are contiguous. They have only been shown in a separated manner in FIG. 3 so that the relative movement and cooperation of parts can be more clearly seen.

Still referring to FIG. 3, storage circuit 60 basically comprises a digital shift register 62 and an identical shift register 64 that are joined by a common conductor 66. Bits of data may be shifted from shift register 62 to shift register 64 through conductor 66, and data may be shifted out of shift register 64 through a conductor 68.

Operating circuit 70 basically comprises a time interval selector 72 which is connected to a clock generator 76 through a conductor 74. Selector 72 controls the frequency of pulses produced by clock generator 76 on a conductor 78 through a control located on panel 26 (FIG. 2). By varying the frequency of pulses produced by clock generator 76, time interval selector 72 controls the speed with which the scan stepping motor moves boom 41 along paths A and D. This is achieved because scan stepping motor 52 moves boom 41 a predetermined distance in response to the receipt of every 20th clock pulse produced by the clock generator. In addition to operating stepping motor 52, the clock generator also provides pulses to shift registers 62, 64 and to a gating circuit 86 that operates the shift registers.

The operating circuit also comprises a pulse height analyzer 80 which receives electrical pulses corresponding to gamma ray events from the photomultiplier tube in detecting assembly 35 over a conductor 82. In a well known manner, the pulse height analyzer produces output pulses on an output conductor 84 only in response to electrical pulses having amplitudes within a predetermined range of values. Such pulse height analyzers are well known in the art, and are generally used in scintillation scanners in order to prevent the counting of gamma rays having energy levels outside a known energy spectrum. The output of pulse height analyzer 80 is connected to gating circuit 86 which includes buffer circuits that temporarily store the output pulse until they can be shifted into the shift registers in synchronism with the clock pulses produced by the clock generator. In this manner, information bits representing gamma ray events can be moved through the shift registers in a manner which coincides with the scanning positions of detecting assembly 35. In other words, gating circuit 86 makes sure that information is clocked through shift registers 62 and 64 at a rate which is directly proportional to the distance covered by detecting assembly 35. As a result of this unique apparatus, the amount of gamma ray activity along any particular segment of scan path A or D may be easily determined. After the electrical pulses have been synchronized with the clock generator and gating circuit 86, they are transmitted to shift register 62 over an output conductor 88.

Control system 100 basically comprises an accounting circuit 102 that receives input pulses from an output of gating circuit 86 over a cable 104 and from the output of shift register 64 over conductor 68. The accounting circuit produces an output corresponding to a binary number which represents the total number of bits of information stored in shift registers 62 and 64. This number is transmitted over a series of conductors shown schematically as conductor 106 to a digital to analog generating circuit 110. Generating circuit 110 produces a DC analog voltage on an output conductor 112 having a magnitude which is proportional to the value of the number produced by the accounting circuit. The signal appearing on conductor 112 is attenuated in a normalizing circuit 114 which is controlled by time interval selector 72 through a conductor 116. Basically, normalizing circuit 114 attenuates the analog signal produced by generating circuit 110 so that it normally covers a range of about 0 – 5 volts irrespective of the pulse frequency of clock generator 76. The normalized voltage is transmitted over an output conductor 118 to a background erase circuit 120 which is controlled through a conductor 122 by a background erase control 124 located on front panel 26 (FIG. 2). The background erase circuit 120 compares the normalized DC voltage appearing on conductor 118 with a threshold control voltage appearing on conductor 122. If the normalized voltage is greater than the threshold voltage, thereby indicating a significant amount of gamma ray activity in the area being scanned, background erase circuit 120 produces an output signal on an output conductor 126 that is transmitted to a contrast enhance circuit 128. At the same time, an output signal is generated over a conductor 140 that enables an event information pulse transmitted over a conductor 142 from between the shift registers to pass through an AND gate 143 and a conductor 145 to energize a light control circuit 136. If the normalized voltage appearing on conductor 118 is less than the threshold voltage appearing on conductor 122, no output pulse is generated on conductor 140, so that no light pulse is produced. Background erase control circuit 124 is capable of producing a range of threshold voltage signals that can substantially vary the degree of gamma ray activity required in order to energize light control circuit 136.

Contrast enhance circuit 128 is connected to a contrast enhance control 132 through conductors 130, 131. Contrast enhance control 132 contains a group of nonlinear elements which control a nonlinear amplifier that operates on the normalized voltage received from background erase circuit 120 to prodice a control voltage. The control voltage is transmitted over a conductor 134 that operates light control circuit 136 in a nonlinear manner. As a result, the intensity of light pulses produced by light source 37 is regulated so that light pulses occurring in an area of relatively high gamma ray activity make a relatively dark image on film 39 and pulses occurring in an area of relatively low gamma ray activity produce a relatively light image on film 39.

As shown in FIG. 3, light control circuit 136 transmits a control signal over a conductor 144 in order to vary the intensity of the light produced by light source 37. As previously explained, if the proper output voltage is not produced on conductor 140, no light pulse at all is produced by source 37. Light beam L produced by source 37 is transmitted through a flat prism 38 which can be pivoted into two different positions by position control apparatus 150 which operates a control rod 152 connected to the prism frame. In the first position, prism 38 refracts the light beam so that it moves one-quarter centimeter in the R direction, and in the second position, prism 38 refracts the light beam so that it moves one-quarter centimeter in the F direction. As will be explained in more detail later, the prism must be pivoted to its different positions on successive scan paths so that gamma rays occurring in adjacent locations of paths A and D are recorded in adjacent locations on paths A and d of film 39.

The operation of the apparatus referred to in the above general description will now be described assuming that scan stepping motor and operating circuit 50 is moving boom 41 along scan path A in direction F so that detecting assembly 35 receives radiation from point S on path A. As boom 41 is moved in direction F, gamma rays are detected and converted to electrical pulses by detecting assembly 35. The electrical pulses transmitted by pulse height analyzer 80 are clocked by gating circuit 86 and are shifted into shift register 62 where they are stored as individual information bits each representing a gamma ray event. Assuming the gamma ray activity level in area L is below the threshold level established by background erase control 124, no light pulses are produced by light source 37, and no image is produced on film 39. However, bits of information representing gamma ray events are shifted one position in shift register 62 upon the receipt of each clock pulse over conductor 78. At the same time clock generator 76 is shifting gamma ray event information bits through shift register 62, it is also producing pulses which are divided by 20 and are used to drive scan stepping motor 52. As previously explained, stepping motor 52 is designed so that it moves boom 41 a predetermined incremental distance in response to the receipt of each clock pulse. As a result, it is possible to determine the level of gamma ray activity occurring on any particular segment of scan line A by merely determining the number of information bits clocked through the shift register in response to the clock pulses which caused the stepping motor to move through that scan line segment. In the present embodiment, scan stepping motor and operating circuit 50 is designed so that the clock pulses required to move boom 41 one-quarter centimeter along scan line A are also sufficient in number to move a bit of information from input conductor 88 to output conductor 66 of shift register 62. For example, assuming path segment B is one-quarter centimeter in length, the bits of information corresponding to gamma ray events occurring in segment B begin to be shifted into shift register A as detecting assembly 35 passes over borderline BD.

As detecting assembly 35 is moved over line BD in the F direction, gamma ray events occurring just inside area H are detected. It is assumed that in area H there is a high gamma ray activity level in excess of the threshold level established by background erase control 124. According to a novel feature of the invention, the gamma ray event occurring at borderline BD does not immediately produce a light pulse which is used to expose film 39. Instead, the information bits from scan path segment B which are stored in shift register 62 are shifted bit-by-bit into shift register 64, and information bits representing gamma ray events occurring along scan path segment C are shifted into shift register 62 in place of the previous data. Path segment C is also one-quarter centimeter in length. By the time detecting assembly 35 is moved to the position shown in solid lines in FIG. 3 (i.e., the position over point T), shift register 64 contains information bits from line segment B and shift register 62 contains information bits from path segment C. At this point in time, the information bit representing the gamma ray event occurring at borderline BD is transmitted in the form of a square-wave voltage pulse over conductors 66 and 142 to AND gate 143.

As detecting assembly 35 has been moved over path segment C, accounting circuit 102 has determined the total bits of information stored in shift registers 62 and 64. This information continuously is converted to an analog DC potential by circuit 110 and is normalized by circuit 114 in the manner previously described. The normalized voltage is compared with the threshold potential in the background erase circuit 120. Since area H is an area of high gamma ray activity, the accumulation of information bits in shift register 62 from line segment C increases the average number of information bits stored in both shift registers. At this point, it will be assumed that the average level of gamma ray activity in scan path segments B and C combined exceeds the threshold level established by background erase control 124 just as detecting assembly 35 passes over point T and light source 37 passes over point T1. As a result, an output signal is produced on conductor 140 which switches AND gate 143 to its 1 state, thereby causing light control circuit 136 to allow the production of a beam of light L by light source 37. Light beam L is refracted one-quarter centimeter in the R direction by prism 38 so that it is projected onto line BD1 instead of point T1.

It should be noted that a gamma ray event occurring at line BD has its recording controlled by gamma ray events occurring both before and after line BD in scan line segments B and C. This is an important feature, since it enables the system to accurately evaluate the extent to which the gamma ray event occurred in an area of low gamma ray activity, high gamma ray activity, or on the borderline of such areas.

As detecting assembly 35 continues to be moved in the F direction, additional bits of information resulting from gamma ray events occurring in area H are shifted into shift registers 62 and 64 so that the threshold level established by background erase control 124 is continually exceeded. As shown in FIG. 3, pulses of light recording gamma ray events in area H continue to expose film 39.

It should be noted that the system may begin to expose film 39 in an area just before line BD1 or just after line BD1 depending on the exact setting of background erase control 124. However, as will be described later, if the system begins to produce pulses before line BD1 while scanning in the F direction, it produces pulses after line BD1 while scanning in the R direction, so that gamma ray events occurring in adjacent locations on paths A and D are recorded in adjacent locations on film 39.

When detecting assembly 35 is moved to the extreme end position in the F direction along scan path A, a switch is thrown so that scan stepping motor and operating circuit 50 is de-energized and index stepping motor and operating circuit 44 is energized. As a result, ball screw 43 is turned so that carriage 42 is moved in the Y direction until detecting assembly 35 is located over the scan path D. At this time, index stepping motor and operating circuit 44 is de-energized and scan stepping motor and operating circuit 50 is re-energized in the reverse direction, so that detecting assembly 35 and light source 37 begin to travel in the R direction along scan path D. During this period of time, prism 38 is switched to its second position so that light beam L is refracted one-quarter centimeter in the F direction. As detecting assembly 35 passes over point U of scan path D in the R direction, information bits representing gamma ray events occurring along path segment E begin to enter shift register 62. As detecting assembly 35 passes over line BD of scan path D (i.e., the position shown in phantom at $P_3$), information bits representing gamma ray events occurring in path segment E begin to enter shift register 64, and information bits representing gamma ray events occurring in path segment F begin to enter shift register 62. As previously noted, the recording of a gamma ray event occurring at line BD is delayed until the detecting assembly travels another quarter centimeter, i.e., until it attains the position shown in phantom at $P_2$ in which detecting assembly 35 is positioned over point V and light source 37 is positioned over point V1. At this time, the average number of information bits stored in shift registers 62 and 64 is still higher than the threshold level established by background erase control 124. As a result, background erase circuit 120 produces a signal on output conductor 140, and AND gate 143 is switched to its 1 state, thereby enabling light source 37 to produce a light pulse which is focused on film 39. It will be noted that light beam L passes through prism 38 in its second position, so that the beam is refracted one-quarter centimeter in the F direction. As a result, it is focused adjacent line BD1 instead of position V1.

As detecting assembly 35 is moved beyond position V, the average number of information bits stored in shift registers 62 and 64 combined falls below the threshold level set by background erase control circuit 124 so that gamma ray events occurring just beyond the BD line in the L area result in no light pulses.

Of course, it will be clear to those skilled in the art that light pulses will not be produced exactly at line BD1 in the manner previously described if background erase control 124 is set to a different level. If the control is adjusted to a lower threshold level, light pulses will begin to be produced in segment BD1 of scan path A rather than at line BD1. However, the reverse mode of operation will occur on scan path D so that light pulses will not be produced until line segment F1 has been penetrated to a point adjacent the corresponding images appearing in line segment B1 of scan path A. As a result, borderline BD will be represented by a similar line on film 39 parallel to and slightly displaced from line BD1.

If the background erase control is adjusted to a higher threshold level, the reverse process will take place so that border line BD will be represented on film 39 by a line parallel to line BD1 which passes through line segments C1 and E1.

The foregoing description has been given assuming that the contrast enhance circuit 128 was inoperative. However, those skilled in the art will recognize that a similar mode of operation can be achieved in which "scalloping" is eliminated when contrast enhance circuit 128 is energized. The operation of this circuit results in an image of increased opacity in film path segments C1 and E1 in which no "scalloping" effect appears.

DETAILED DESCRIPTION

Recording Assembly 36

Figure 4:
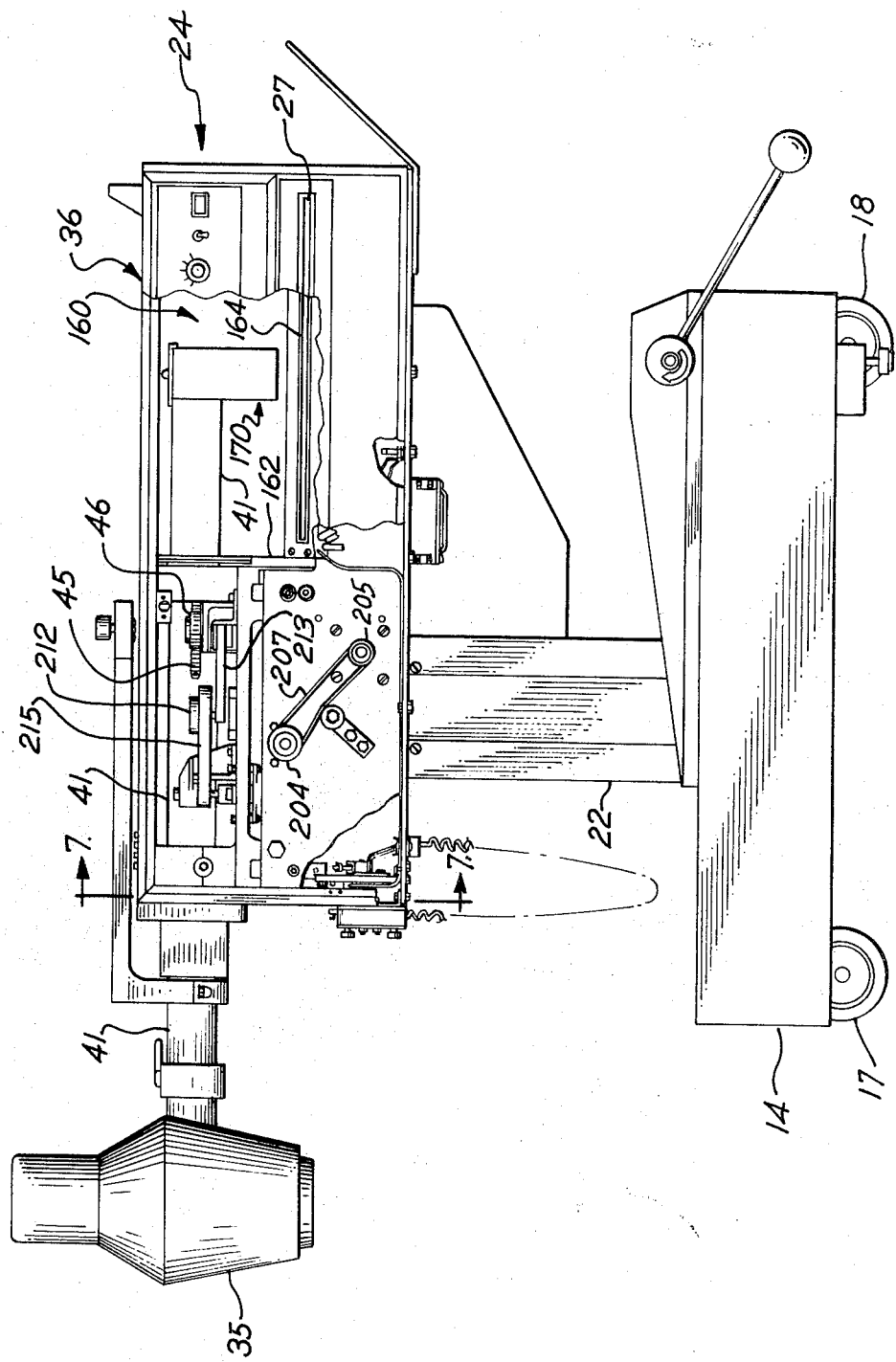
FIG. 4 is a front elevational view of the scanner shown in FIG. 1 with the front panel thereof removed to show the scanning, detecting, and recording assemblies thereof.

Referring to FIG. 4, recording assembly 36 comprises a light-tight film chamber 160 formed inside cabinet 24. Boom 41 extends into chamber 160 through a slot located in a wall 162 in the central portion of the cabinet. When the scanner is in use, a film cassette 164 is entered through access slot 27 so that film sheet 39 is positioned directly below a light source assembly 170 which is rigidly mounted to boom 41.

Figure 5:
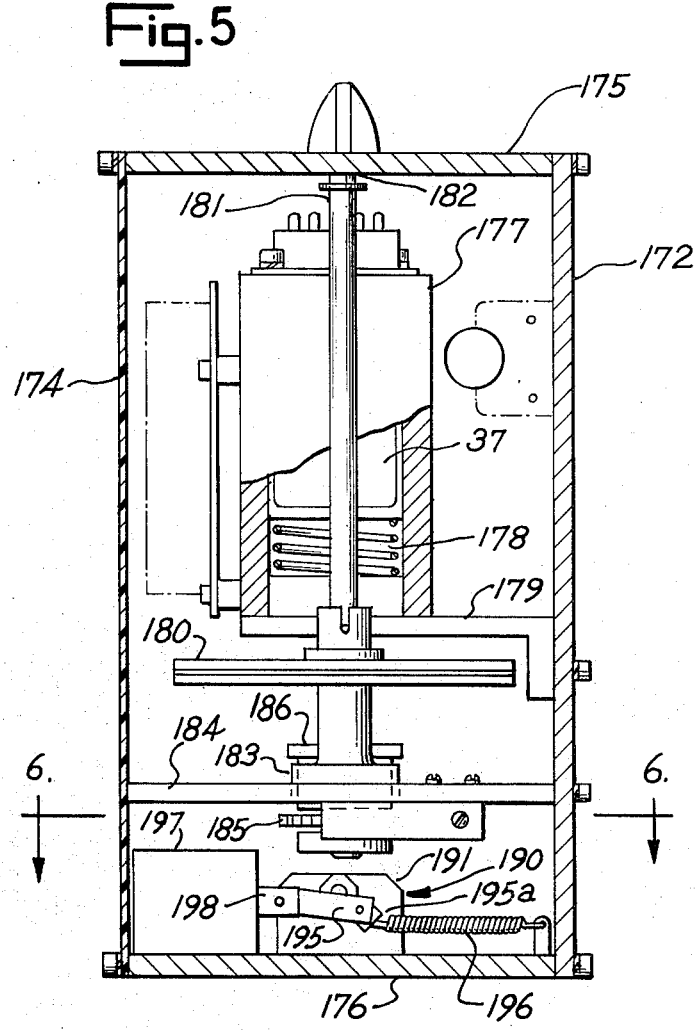
FIG. 5 is a front cross-sectional view showing a preferred form of a portion of the recording assembly shown in FIG. 4 together with a preferred form of a position control apparatus made in accordance with the present invention.
Figure 6:
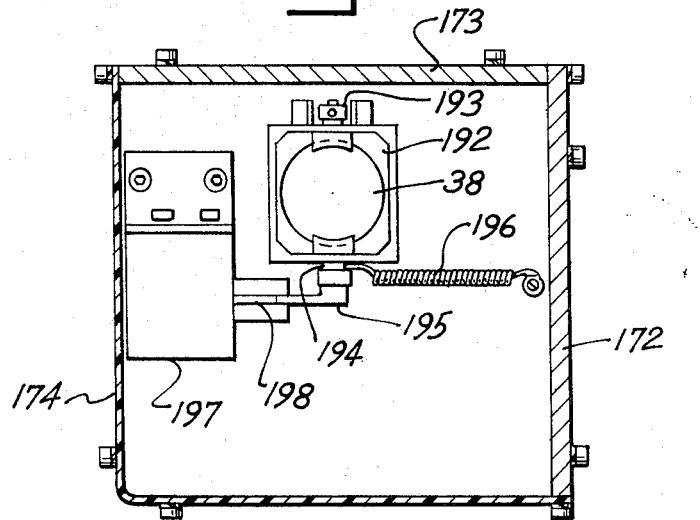
FIG. 6 is a view taken along line 6—6 of FIG. 5.

Referring to FIGS. 5 and 6, light source assembly 170 comprises side walls 172 and 173, a cover 174, a top plate 175, and a bottom plate 176 that is drilled with a hole to allow light to focus on film sheet 39.

As shown in FIG. 5, light source 37 comprises a glow modulator tube that is held in position by a shield 177 and by a locator spring 178 that are mounted on a bracket 179.

The light beam produced by tube 137 is transmitted in a downward direction through a rotatable aperture disc 180 that is drilled with a number of aperture holes which vary in size. Disc 180 is centrally mounted on a shaft 181 that is journaled in an upper bearing 182 and a lower bearing 183 located in a horizontal support plate 184. The aperture disc may be rotated from a remote location by a gear and ratched device 185.

The light beam generated by tube 37 is transmitted downward through a focusing lens 186 and a prism assembly 190 shown in more detail in FIG. 6.

Prism assembly 190 comprises a housing 191 having four vertically-standing walls that support flat planar prism 38. The prism is held in a frame 192 that is connected to shafts 193 and 194. The shafts are rotatably mounted through housing 191. Shaft 194 is connected to a bracket 195a which is, in turn, rotatably mounted in an arm 195 that is biased in the position shown by a return spring 196. Arm 195 can be moved to an energized position by a solenoid 197 that operates the arm through a drive rod 198. The solenoid is energized while one path is scanned and is de-energized while the next subsequent path is scanned so that the light beam transmitted by tube 37 is refracted from its normal position by a distance of one-quarter centimeter in one of two directions depending on the position of the prism. After the light is refracted by prism 38, it is projected through a hold in bottom plate 176 onto film sheet 39 as shown in FIG. 4.

SCANNING ASSEMBLY 40

Referring to FIGS. 4, 7, and 8, index stepping motor and operating circuit 44 comprises vertical support walls 200 and 201 which support ball screw 43 through a bearing 203 mounted in wall 200 and a like bearing mounted in wall 201 (not shown). Ball screw 43 is mechanically attached to a pulley 204 that is driven by a pulley 205 through a belt 207. Pulley 205 is connected to the shaft of index stepping motor 44a.

Referring to FIG. 8, scanning stepping motor and operating circuit 50 comprises a double-hub pulley 212 which drives pinion gear 46 from its inner hub through a belt 213. As previously described, pinion gear 46 is engaged with a rack 45 that is mechanically connected to boom 41. The outer hub of pulley 212 is driven by another pulley 216 through a belt 215. Pulley 216, in turn, is driven by scan stepping motor 52 through an appropriate drive assembly 220.

Referring to FIG. 9, scan stepping motor 52 is advanced by a scan stepping motor operating circuit 222. This circuit comprises a forward switch 224 that is engaged when boom 41 reaches one end of a scan path and a reverse switch 226 that is engaged when boom 41 reaches the opposite end of a scan path. These switches provide command signals to a conventional Gray code generator 228 that generates appropriate pulses for stepping the scan stepping motor 52. The frequency of operation of the Gray code generator is determined by the clock pulses received on conductor 78 from clock generator 76. The clock pulses are passed through a decade counter 230 which divides the frequency of the pulses by 10. The output of the decade counter is connected to the clock input of a bistable flipflop 232 that divides the pulse frequency by 2. The output of the flipflop is connected through an amplifier 234 to one input of the Gray code generator. As a result of this arrangement, the frequency of the clock pulses received on conductor 78 is divided by 20 in order to operate scan stepping motor 52. As previously mentioned, scan stepping motor 52 rotates through a precise, predetermined arc in response to the receipt of each clock pulse by generator 228. The output of the Gray code generator is connected through a conventional stepping motor drive 236 that provides sufficient current to drive the motor.

OPERATING CIRCUIT

Referring to FIG. 9, operating circuit 70 comprises a unijunction oscillating circuit 250 that is controlled by a potentiometer 240 comprising time interval switch 72. Circuit 250 also comprises capacitors 251–254, resistors 255–257, an inductor coil 259, diodes 261, 262, a junction transistor 263, a unijunction transistor 264, an amplifier 265, and a NAND gate 267, all connected as shown. The unijunction oscillator circuit further comprises a one-shot multivibrator 270 consisting of capacitors 272,273, resistors 275, 276, a diode 278, and NOR gates 280, 281. As is well known to those skilled in the art, a unijunction transistor 264 produces pulses at a frequency basically determined by the value of potentiometer 240 and the values of capacitors 251, 252, and 254 connected to the gate terminal thereof. One-shot multivibrator 270 produces well-defined, square-wave pulses in response to the signals generated by unijunction transistor 264. Circuit 250 also comprises an inverting NOR gate 282 that is connected to output conductor 78.

Referring to FIG. 10, gating circuit 86 comprises a high-speed clock circuit 290 consisting of a crystal-controlled oscillator 292 that has its output frequency divided by flipflop circuits 294 and 295. Oscillator 292 is used as a high-speed clock to introduce 0 state pulses into shift registers 62 and 64 to clear the registers at the end of a scan line. Additional pulses used to operate the shift registers and gating circuit are supplied on conductor 78 from clock generator 76. A selecting network consisting of NAND gates 297–299 provides the logic which determines whether the circuitry is operated by crystal-controlled oscillator 292 or the clock pulses transmitted on conductor 78. Conductor 293 is switched to its 0 state whenever boom 41 is traveling along a scan path. The output of NAND gate 297 is transmitted over a conductor 296 in order to clock the binary counter shown in FIG. 12 hereafter.

Gating circuit 86 also comprises a phase 1 - phase 2 circuit 300 that generates the clocking pulses shown schematically in FIG. 11. More specifically, circuit 300 comprises a bistable flipflop 302, NAND gates 304, 305, inverting amplifiers 307, 308, and resistors 309, 310. As shown in FIG. 10, the phase 1 signal shown in FIG. 11 is generated at the output of NAND gate 304 and the phase 2 signal shown in FIG. 11 is generated at the output of NAND gate 305.

Gating circuit 86 also comprises a level-shifting circuit 312 consisting of resistors 314–319 and transistors 321–324. Another level shifting circuit 326 consists of resistors 328–331 and transistors 333, 334, all connected as shown.

Gating circuit 86 also comprises an information clocking circuit 336 consisting of buffer flipflops 338, 342, and a reset flipflop 340. The clocking circuit also consists of inverting amplifiers 344, 346, a transistor 347, resistors 348 – 350, and a NAND gate 352.

The information clocking circuit synchronizes the input of data from the pulse height analyzer over conductor 84 into shift registers 62 and 64 in the following manner. A pulse on conductor 84 switches the Q output of flipflop 338 to its 1 state, thereby enabling NAND gate 352 to switch to its 0 state as soon as an inverted phase 2 clock pulse is received from NAND gate 305. As soon as NAND gate 352 is switched to its 0 state, flipflop 342 is reset so that its Q output is switched to its 0 state and its $\bar{Q}$ output is switched to its 1 state. Flipflop 342 remains with its $\bar{Q}$ output in the 1 state until the next phase 1 pulse is received from the emitter of transistor 323. At this time, the 1 state of the $\bar{Q}$ output of flipflop 342 is transmitted through level shifting circuit 326 and conductor 88 and is shifted into shift register 62. As the phase 1 pulse terminates, the $\bar{Q}$ output of flipflop 342 returns to its 0 state and the Q output returns to its 1 state. At this time, reset flipflop 340 is clocked so that flipflop 338 is reset and is made available to accept an additional event pulse from conductor 84. The resetting of flipflop 338, in turn, resets flipflop 340.

As previously described, the foregoing operation enables data to be shifted through the shift registers in synchronism with the positional movement of the scan stepping motor. Of course, the bits of information stored in the shift registers are shifted in synchronism with the clock pulses appearing on conductor 78 even though no new data is entered on conductor 84. As previously described, information bits are shifted from register 62 to 64 through a conductor 66. In addition, the information bits are also conducted through a NAND gate 354 to conductor 142 which is connected to AND gate 143 (FIG. 3).

CONTROL SYSTEM

Referring to FIGS. 10 and 11, accounting circuit 102 comprises a gate circuit 356 consisting of NAND gates 358–361, inverting amplifiers 362–364 and output conductors 365 and 366. Accounting circuit 102 also comprises binary counters 370–372 which count up if conductor 366 is in its 1 state and count down if conductor 366 is in its 0 state. In addition, counters 370–372 are enabled to count if conductor 365 is in its 1 state and are disabled from counting if conductor 365 is in its 0 state.

Gating circuit 356 is arranged so that binary counters 370–372 count up if a bit of information is shifted into the shift registers, but no bit of information is shifted out (i.e., the 1 in-0 out case), and is arranged so that the counters count down if no bit of information is shifted into the shift registers, but a bit of information is shifted out (i.e., the 0 in-1 out case). In addition, circuit 356 is arranged so that the binary counters are disabled from counting if a bit of information is shifted into the shift registers at the same time a bit of information is shifted out (i.e., the 1 in-1 out case), and the binary counters are also disabled if no bit of information is shifted into or out of the shift registers (i.e., the 0 in-0 out case). In order to achieve the foregoing results, NAND gate 361 is switched to its 0 state for the 1 in-0 out case and is switched to its 1 state for the 0 in-1 out case. The binary counters are enabled or disabled through the operation of NAND gates 358–360. Basically, NAND gate 360 is always switched to its 1 state except when the input conductor from NAND gates 358 and 359 is switched to its 0 state. This occurs in the 1 in-1 out case when NAND gate 358 is switched to its 0 state, and in the 0 in-0 out case when NAND gate 359 is switched to its 0 state. For these two cases, NAND gate 360 is switched to its 1 state so that the counters are disabled through inverting amplifier 363.

Figure 12:
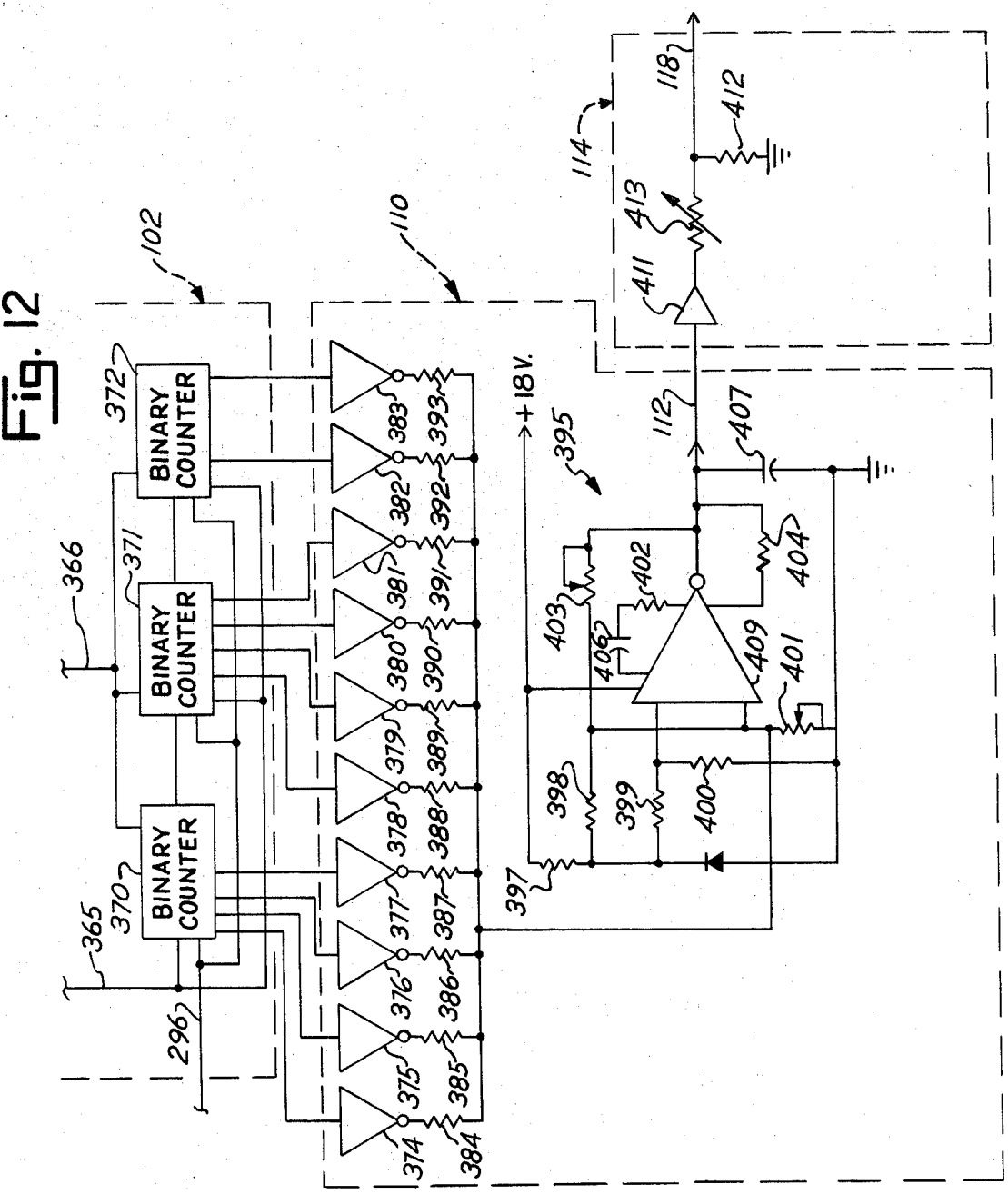
FIG. 12 is a schematic diagram showing a preferred form of a counting circuit, a digital to analog generating circuit and a normalizing circuit.

Referring to FIG. 12, digital to analog converter 110 comprises inverting amplifiers 374–383 and associated resistors 384–393, respectively, all connected as shown. The values of resistors 384–393 are varied so that the resulting DC voltage on the outputs of the resistors has a magnitude which corresponds to the magnitude of the binary number stored in the binary counters 370–372. The output of the resistors is connected to an amplifying circuit 395 comprising resistors 397–404, capacitors 406, 407, and a conventional amplifier 409. The output of amplifying circuit 395 is transmitted over a conductor 112 to normalizing circuit 114 which comprises an amplifier 411, a resistor 412, and an adjustable potentiometer 413 connected as shown. Potentiometer 413 is ganged with the potentiometer 240 in the time interval switch circuit. Potentiometers 240 and 413 are arranged so that the voltage produced on conductor 118 ranges from about 0 to 5 volts irrespective of the frequency of clock generator 76 or the rate of movement of boom 41.

Figure 13:
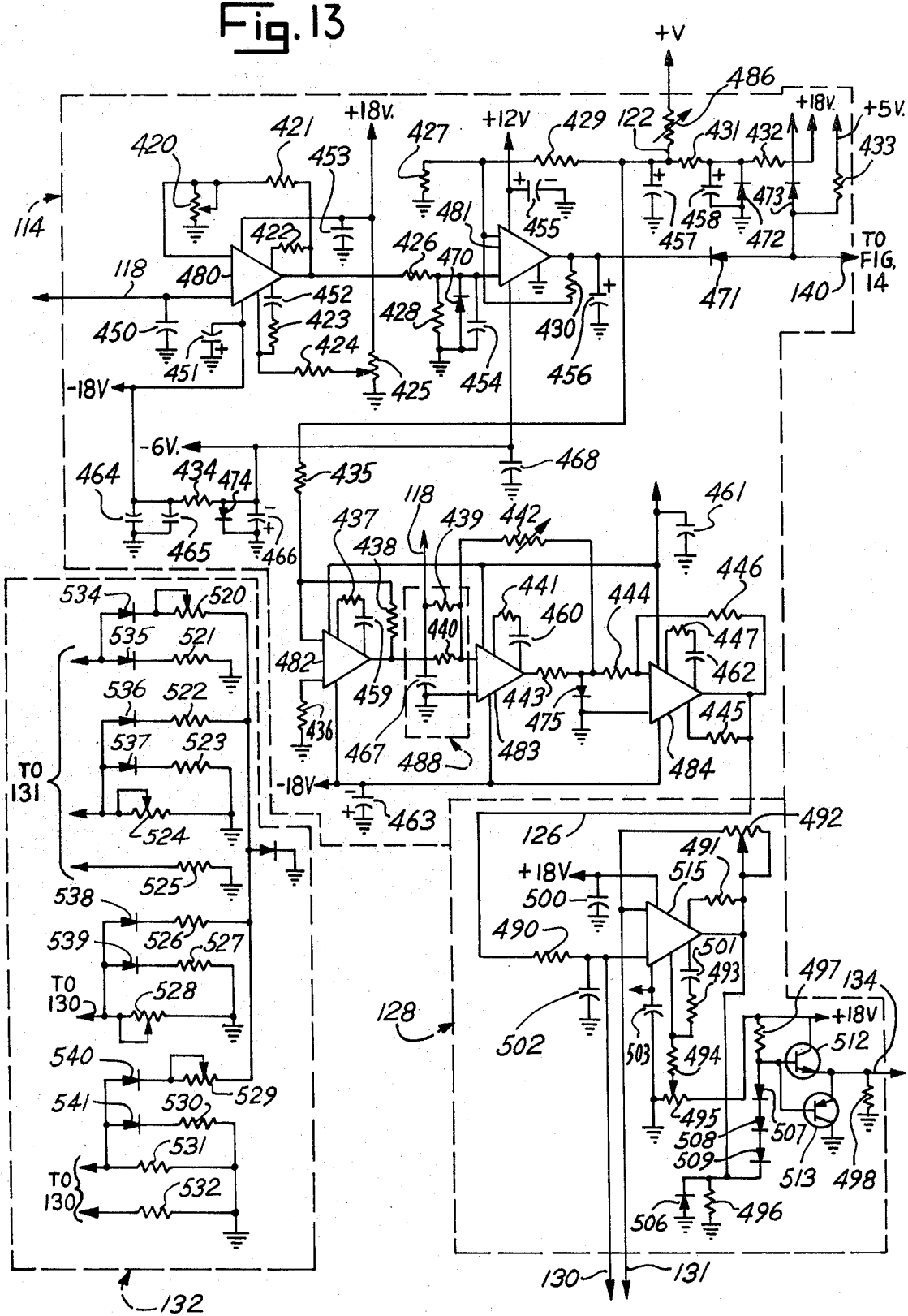
FIG. 13 is a schematic drawing of a preferred form of a background erase circuit, a background erase threshold circuit, a contrast enhance circuit and a contrast enhance control circuit.

Referring to FIG. 13, background erase circuit 114 comprises resistors 420–447, capacitors 450–468, diodes 470–475, and amplifiers 480–484. As previously described background erase circuit 114 is controlled by a threshold voltage which is transmitted over conductor 122 from a background erase control 124. As shown in FIG. 13, control 124 comprises a potentiometer 486. The threshold voltage transmitted over conductor 122 is current summed with the normalized enhancement voltage transmitted over conductor 118 in a summing circuit 488 comprising resistors 439 and 440. The voltage resulting from the comparator circuit is expanded by amplifier 483, the gain of which is controlled by a variable potentiometer 442 in the feedback circuit thereof. After again being amplified by amplifier 484, the resulting voltage is transmitted to the contrast enhance circuit 128 over conductor 126.

Contrast enhance circuit 128 comprises resistors 490–498, capacitors 500–503, diodes 506–509, transistors 512, 513, and an amplifier 515.

As previously described, the contrast enhance circuit is controlled by a contrast enhance control 132 which comprises resistors 520-532 and diodes 534-541. Various combinations of the resistors and diodes of contrast enhance control 132 may be placed across conductors 130, 131, by switching means not shown. As a result, the degree of contrast enhancement may be controlled by the operator. It should be noted that the contrast enhance control circuitry is connected in the feedback loop of amplifier 515.

The contrast enhance control voltage is generated on conductor 134 through which it is transmitted to light control circuit 136.

Referring to FIG. 14, light control circuit 136 comprises resistors 546-554, capacitors 556,557, a diode 558, and transistors 560-563.

If the normalized voltage transmitted on conductor 118 exceeds the threshold level established by control 124 (FIG. 3), AND gate 143 is enabled by the next pulse produced by shift register 62 so that a square-wave voltage pulse is transmitted over conductor 145 to transistor 563 (FIG. 14). As a result, transistor 563 is switched on and transistor 562 is switched off so that the contrast enhance voltage transmitted over conductor 134 is conducted to transistor 561. Transistor 561, in turn, controls the amount of current flowing through transistor 560 which acts as a current sink for regulating the current flow through glow tube 37. After the tube begins to conduct, the intensity of illumination generated by the tube is controlled by the voltage appearing on conductor 134 until the pulse controlling AND gate 143 terminates. At this point in time, transistor 563 is switched off and transistor 562 is switched on so that the voltage available at conductor 134 is shunted to ground. Thereafter, transistor 560 prevents the conduction of additional current through glow tube 37. As a result, the tube ceases to produce light until the next pulse is received from AND gate 143.

Those skilled in the art will recognize that the preferred embodiment described herein is merely exemplary of the preferred practice of the invention, and that modifications and alterations may be made without departing from the spirit and scope of the invention.

We claim:

1. In a scintillation scanner comprising detection means for detecting a predetermined class of events, improved apparatus for controlling the recording of individual events on a recording medium in response to the concentration of other such events in the class occurring in the areas adjacent the individual events, comprising in combination:
   recording means for recording the occurrence of an individual event in the class on the recording medium;
   scanning means for moving the detection means in a first direction along a first scan path and for moving the detection means along a second scan path parallel to the first scan path;
   coupling means for coupling the detection means to the recording means whereby the detection means and the recording means are moved simultaneously;
   storage means for storing individual event information representing an individual event in the class occurring at an arbitrary first location along the first scan path and for storing information representing other events in the class occurring before and after the individual event in segments of the first scan path lying on both sides of the first location;
   operating means for transmitting information representing events in the class from the detection means to the storage means and for operating the storage means;
   transmitting means for transmitting the individual event information from the storage means to the recording means;
   control means for analyzing the information stored in the storage means and for controlling the recording means so that the individual event information is recorded in response to the value of the stored information; and
   means for maintaining the recording means and the recording medium in a first relative position while the detection means is moving along the first scan path and for maintaining the recording means and the recording medium in a second relative position while the detection means is moving along the second scan path, whereby events occurring in adjacent locations of the first and second scan paths are recorded in adjacent locations on the recording medium.

2. Apparatus, as claimed in claim 1 wherein the recording means comprises a beam of light and means for generating the beam of light.

3. Apparatus, as claimed in claim 2, wherein the means for generating comprises a glow modulator tube.

4. Apparatus as claimed in claim 1, wherein the scanning means comprises stepping motor means adapted to receive a clock pulse for moving the detection means a predetermined distance in response to each clock pulse.

5. Apparatus, as claimed in claim 1, wherein the coupling means comprises a boom on which the detection means and the recording means are mounted.

6. Apparatus, as claimed in claim 1, wherein the storage means comprises:
   first storage means for storing said individual event information and for storing information representing events occurring in a first segment of the first scan path extending from the first location in the first direction;
   second storage means for storing information representing events occurring in a second segment of the first scan path extending from the first location in a second direction opposite the first direction; and
   means for transferring information between the first and second storage means.

7. Apparatus, as claimed in claim 6, wherein the first storage means comprises a first shift register means for storing digital information and wherein the second storage means comprises a second shift register means for storing digital information.

8. Apparatus, as claimed in claim 1, wherein the operating means comprises means for retaining the individual event information in the storage means until the information representing said other events occurring before and after the individual event has been stored in the storage means.

9. Apparatus, as claimed in claim 7, wherein the scanning means comprises stepping motor means adapted to receive a clock pulse for moving the detection means a predetermined distance in response to each clock pulse and wherein the operating means comprises:
- clock means for generating clock pulses at a predetermined rate;
- means for transmitting the clock pulses to the stepping motor means;
- buffer means for temporarily storing information corresponding to one of said events and for transferring the information into one of the shift register means in response to a clock pulse; and
- means for transmitting the clock pulses to the first and second shift register means, whereby information is advanced through the first and second shift register means in response to the clock pulses.

10. Apparatus, as claimed in claim 9, wherein the transmitting means is connected between the first shift register means and the second shift register means, whereby information is transmitted by the transmitting means to the recording means as it is shifted from one of the shift register means to the other shift register means.

11. Apparatus, as claimed in claim 1, wherein the control means comprises:
- accounting means for analyzing the information stored in the storage means;
- generating means for generating a control signal having a value corresponding to the value of the information analyzed by the accounting means; and
- driving means for controlling the recording means in a non-linear manner in proportion to the value of the control signal, whereby the contrast with which the event information is recorded is enhanced.

12. Apparatus, as claimed in claim 1, wherein the control means comprises means for disabling the recording means if the value of the stored information is below a preset threshold level.

13. Apparatus, as claimed in claim 11, wherein the accounting means comprises means for determining the total number of bits of information held in the storage means and wherein the generating means comprises a digital-to-analog converter.

14. Apparatus, as claimed in claim 13, wherein the means for determining comprises:
- a counter capable of counting up and counting down; and
- gate means comprising first means for enabling the counter to count up when the value of information entering the storage means is greater than the value of information leaving the storage means, second means for enabling the counter to count down when the value of information entering the storage means is less than the value of information leaving the storage means, and the third means for disabling the counter when the value of information entering the storage means is equal to the value of information leaving the storage means.

15. Apparatus, as claimed in claim 2, wherein the means for maintaining comprises means for deflecting the beam of light.

16. Apparatus, as claimed in claim 15, wherein the means for deflecting comprises:
- a prism;
- means for positioning the prism in the beam of light; and
- means for maintaining the prism in a first position relative to the beam of light when the detection means is moving along the first scan path and for maintaining the prism in a second position relative to the beam of light when the detection means is moving along the second scan path.

17. A method of controlling the manner in which a predetermined class of events is recorded in a scintillation scanner on a recording medium by a recording means having a variable output value capable of altering a predetermined characteristic of the recording medium, said method comprising the steps of:
- detecting events in the class occurring along a first path segment having a predetermined length and having first and second end points;
- detecting events along a second path segment parallel to the first path segment;
- storing information representing said events occurring along the first path segment;
- determining the value of the stored information;
- recording the occurrence of an event located in the first path segment at a location other than at the first or second end points by varying the predetermined characteristic of the recording medium in proportion to the value of the stored information; and
- altering the relative positions at which events are recorded on the recording medium in the first scan path as compared with the second scan path, whereby events occurring in adjacent locations of the first and second scan paths are recorded in adjacent locations of the recording medium.

18. A method, as claimed in claim 17, wherein the step of storing comprises the steps of:
- converting the occurrence of an event into stored information during spaced intervals of time occurring at a constant rate, and
- shifting the storage location of the information at said constant rate.

19. A method, as claimed in claim 17, wherein the step of determining the value comprises the step of determining the total number of bits of information stored.

20. A method, as claimed in claim 17, wherein the steps of recording comprises the steps of:
- generating a beam of radiant energy;
- transmitting the beam toward the recording medium;
- regulating the intensity of the beam in proportion to the value of the stored information.

21. A method, as claimed in claim 20, wherein the step of altering comprises the step of directing the beam along a first path when events are being detected in the first path segment and directing the beam along a second path when events are being detected in the second path.

* * * * *